July 25, 1961  C. HELWIG  2,993,267
METHOD OF REPAIRING AUTOMATIC CHOKE HEATING SYSTEMS
Filed Oct. 28, 1957  2 Sheets-Sheet 1
Fig. 1.
Fig. 1a.
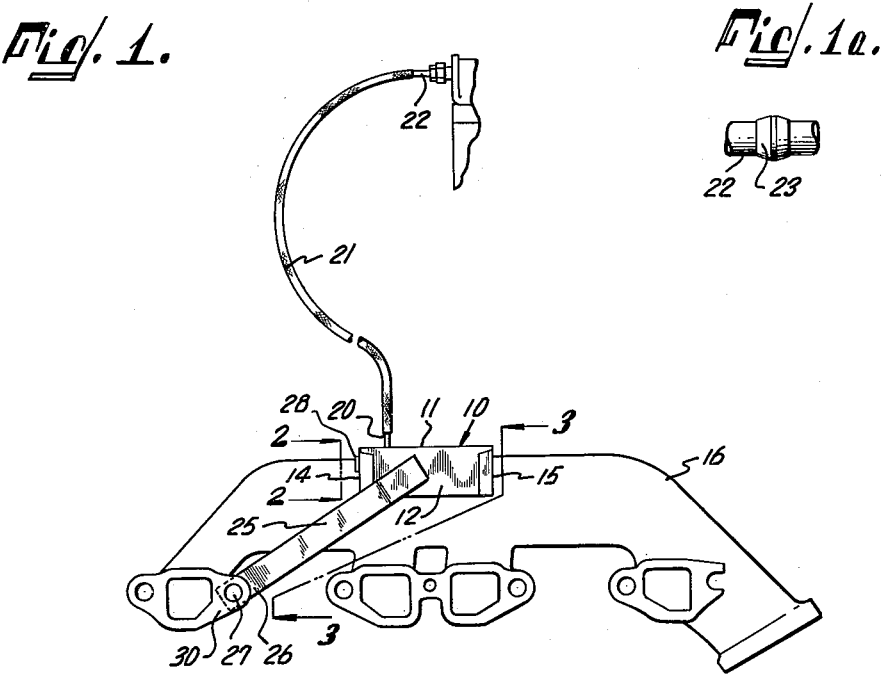
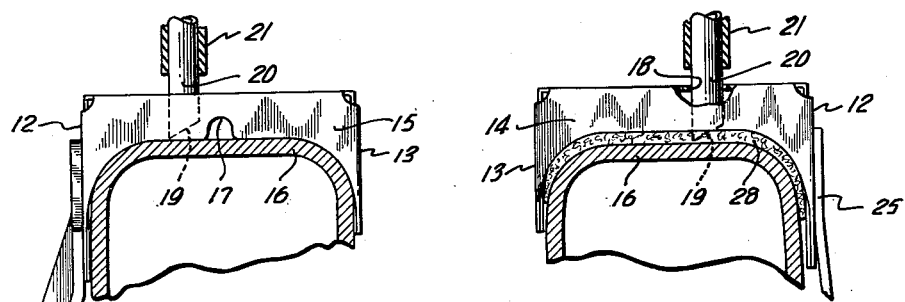
Fig. 3.  Fig. 2.
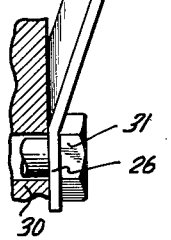
INVENTOR.
CARL HELWIG
BY Robert C. Comstock
ATTORNEY.

July 25, 1961 C. HELWIG 2,993,267
METHOD OF REPAIRING AUTOMATIC CHOKE HEATING SYSTEMS
Filed Oct. 28, 1957 2 Sheets-Sheet 2

INVENTOR.
CARL HELWIG
BY
ATTORNEY.

United States Patent Office 2,993,267
Patented July 25, 1961

2,993,267
METHOD OF REPAIRING AUTOMATIC CHOKE HEATING SYSTEMS
Carl Helwig, Better Parts Specialty, 2601 San Fernando Road, Los Angeles 65, Calif.
Filed Oct. 28, 1957, Ser. No. 692,935
1 Claim. (Cl. 29—401)

This invention relates to a method of repairing the automatic choke heating systems of automotive vehicles.

At the present time, certain automobiles are provided with a tube which extends from the air inlet of the carburetor through the exhaust manifold to the choke assembly. As long as the tubing remains intact, this system operates perfectly. If, however, the tube which passes through the exhaust manifold should leak or break due to the heat and corrosive gases which are constantly present in the exhaust manifold, then the exhaust gases enter the tube and pass through to the choke assembly and carburetor. The choke and carburetor will then become clogged and the gasoline mileage will drop drastically.

It is accordingly an object of the present invention to overcome this situation by providing a method of repair which isolates the existing unserviceable tubing within the manifold and utilizes a new tube which obtains heat from the outside of the exhaust manifold, so that no exhaust gases can possibly enter the tube which conveys the heated air to the choke assembly.

It is accordingly an object of my invention to provide a method of repair having all of the advantages and benefits of the method set forth above. It is particularly an object of my invention to provide a repair method which cannot accidentally carry exhaust gases to the choke or carburetor and which consequently cannot possibly cause damage to these parts of the automobile.

It is a further object of my invention to provide a method of the type described which is capable of being practiced by automobile mechanics and repair shops through the use of a simple kit having parts which are capable of being easily and rapidly installed on the automobile with a minimum of mechanical skill being required.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

FIG. 1 is a side elevational view of the automatic choke system of an automobile after repair by the method of my invention;

FIG. 1a is a side elevational view of a ferrule on a tube;

FIG. 2 is a sectional view of the same, taken on line 2—2 of FIG. 1;

FIG. 3 is a sectional view of the same taken on line 3—3 of FIG. 1;

Figure 5:
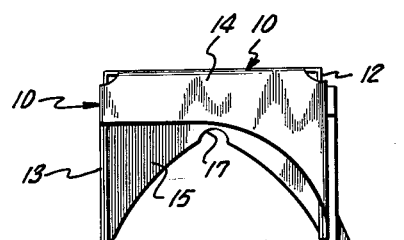
FIG. 5 is an end view of the box shown in FIG. 4.
Figure 4:
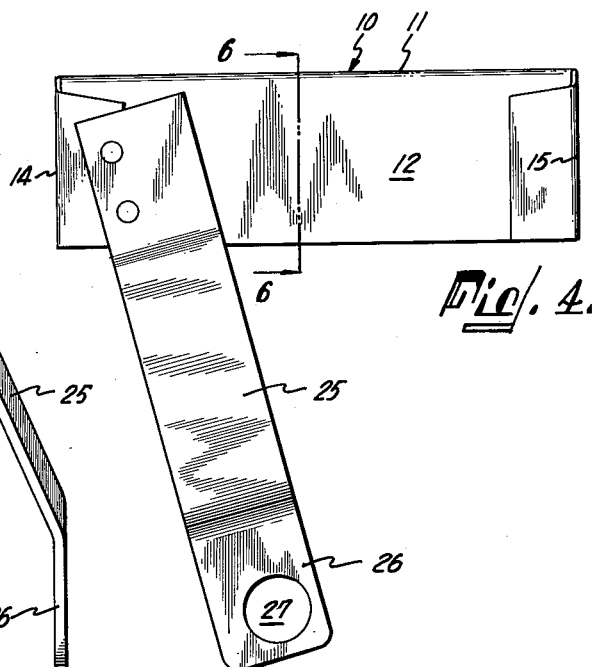
FIG. 4 is a side elevational view of another box in which the cut away portions of the ends and the mounting arm are changed to fit another type of manifold.
Figure 6:
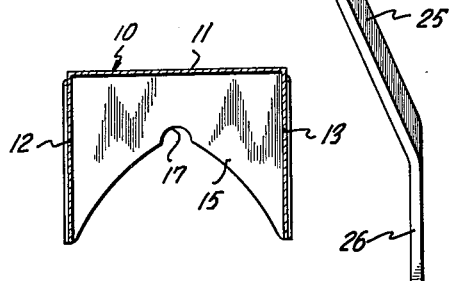
FIG. 6 is a sectional view taken on line 6—6 of FIG. 4.
Figures 7, 8:
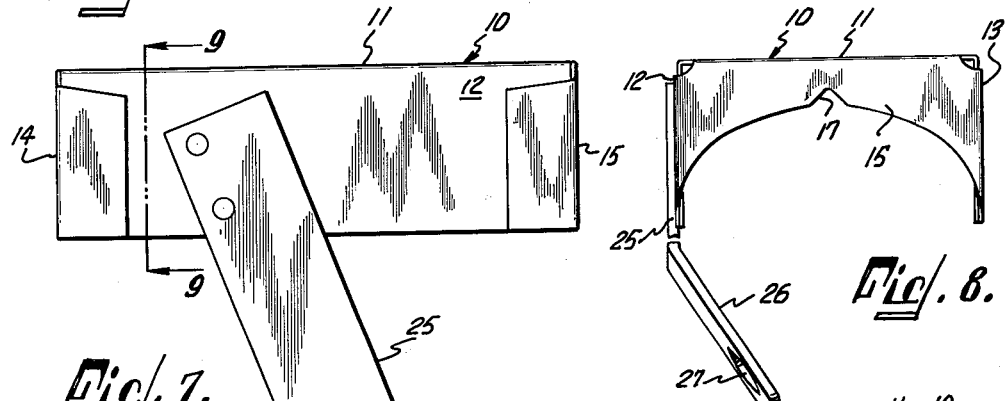
FIG. 7 is a side elevational view of a third type of box in which the cut away portions of the ends and the mounting arm are changed to fit another type of manifold.
FIG. 8 is an end view of the box shown in FIG. 7.
Figure 9:
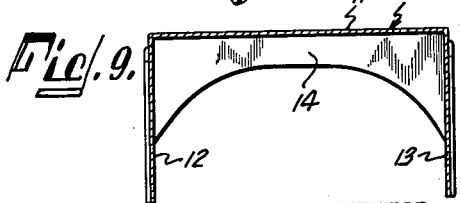
FIG. 9 is a sectional view taken on line 9—9 of FIG. 7.

My method may be practiced by automobile mechanic or repair shop through the use of a kit which contains the necessary parts. The kit includes a box 10 having a substantially rectangular flat top 11, a pair of downwardly depending substantially right angular sides 12 and 13, a pair of downwardly depending right angular ends 14 and 15 and an open bottom. Parts of the ends 14 and 15 are cut away to correspond substantially to the contour of the top of an exhaust manifold 16 on which the box 10 is adapted to be mounted.

The end 15 is provided with an additional notch 17 which is adapted to permit air to enter the box 10 even though the sides and ends of the box are firmly fitted against the manifold 16.

The top 11 is provided with a circular opening 18, which is disposed adjacent the end 14. The opening 18 is adapted to receive the lower end 19 of an elongated copper tube 20. The end 19 is cut at an angle so that it cannot become sealed off by a contact with the top of the manifold 16. The tube 20 is surrounded by an asbestos sleeve 21.

The opposite end 22 of the tube 20 is provided with a brass ferrule 23 in FIG. 3 which is adapted to provide a tight fit of the end 22 with respect to the choke assembly of the automobile. A ferrule of this type is provided with the construction now in use and the ferrule 23 is adapted to serve the same purpose, being disposed between a nut and the choke assembly.

A mounting arm 25 is secured at its upper end to one side of the box 10 and in use extends downwardly in an angle to adjacent one of the mounting bolts of the exhaust manifold. The lower end 26 of the mounting arm 25 is bent at a slight angle and is provided with a circular opening 27.

The parts comprising the kit are preferably disassembled, except that the box 10 is completely formed and the mounting arm 25 is secured to the box 10. The user mounts the box 10 on the top of the manifold so that the lower portions of the sides 12 and 13 engage the sides of the manifold 16. An asbestos gasket 28, which is supplied with the kit, is mounted between the bottom of the end 14 and the top of the manifold 16 is order to completely seal off the end 14. The tube 20 is mounted in the sleeve 21 and its lower end 19 inserted through the opening 18 into the box 10. The existing tubing is disconnected from the choke assembly and the upper end 22 of the tube 20 is connected to the choke assembly in place thereof.

When the box 10 is properly positioned, the mounting arm 25 extends downwardly so that its lower end 26 is disposed substantially parallel to the manifold mounting plate 30. The adjacent mounting bolt 31 is removed from the mounting plate 30 and passed through the open- 27 to secure the mounting arm 25. This prevents any possible displacement of the box 10 from its position on the manifold 16.

The existing tubing which extends from the carburetor to the exhaust manifold is squeezed shut to prevent air from passing through it. The existing tubing which extends from the manifold to the choke is cut off directly above the brass fitting.

In use, the box 10 receives air through the notch 17 and also in most cases through small spaces between the bottom of the end 15 and the manifold 16. The air is held within the confined area of the box and heated by heat from the manifold 16. The heated air moves from the box 10 through the tube 20 to the choke assembly 24, where it facilitates operation of the choke in the manner intended by the manufacturer.

Since I have found that there are three different types of manifolds in use in the above named automobiles, I provide three boxes which differ from each other only in the shape of the cut away portion of the ends and in the shape and positioning of the mounting arm. All three types are illustrated in the drawings.

I claim:

The method of repairing an automotive vehicle of the type having an automatic choke heating system with tubing extending from the carburetor through the exhaust manifold to the automatic choke to supply heated air to the choke, wherein the tubing within the manifold has become unserviceable due to the corrosive effects of gases within the manifold, comprising disconnecting the upper end of the existing tubing which is connected to the choke, disconnecting the lower end of said existing tubing which is connected to the manifold by cutting off said tubing above the fitting which connects it to the manifold, mounting an air entrapping heater on the manifold, said heater having air inlet means for supplying unheated air to said heater, said heater fitting closely against the outside of said manifold in a substantially air-tight manner except for said air inlet means so that air is confined and heated therein, connecting one end of a new tube to said heater so that the heated air from said heater will flow through said new tube, connecting the other end of said new tube to the choke, and squeezing shut the existing tubing which extends from the carburetor to the manifold to isolate the unserviceable existing tubing within the manifold, so that heated air from said heater passes through said tube to the choke in place of the heated air formerly supplied by the unserviceable tubing, to repair said choke heating system without requiring the removal of the unserviceable tubing from the manifold.

References Cited in the file of this patent

UNITED STATES PATENTS

| | | |
|---|---|---|
| 1,227,551 | Montague | May 22, 1917 |
| 1,276,460 | Walker | Aug. 20, 1918 |
| 1,393,887 | Du Bois | Oct. 18, 1921 |
| 1,452,382 | Hills et al. | Apr. 17, 1923 |
| 1,463,484 | Olsen | July 31, 1923 |
| 2,608,389 | Boyce | Aug. 26, 1952 |